United States Patent [19]

Sato

[11] 3,787,762

[45] Jan. 22, 1974

[54] SELF-ADAPTIVE EQUALIZER FOR QUADRATURE AMPLITUDE MODULATED SIGNALS

[75] Inventor: Yoichi Sato, Tokyo, Japan

[73] Assignee: Nippon Electric Company Limited, Tokyo, Japan

[22] Filed: June 23, 1972

[21] Appl. No.: 265,714

[30] Foreign Application Priority Data

June 28, 1971 Japan .............................. 46-46296

[52] U.S. Cl. .................................. 325/42, 325/324

[51] Int. Cl. ............................................ H04b 1/10

[58] Field of Search ...................... 325/321-326, 42, 325/65, 473-477; 333/17, 18

[56] References Cited

UNITED STATES PATENTS

| | | | |
|---|---|---|---|
| 3,676,804 | 7/1972 | Mueller | 333/18 |
| 3,715,666 | 2/1973 | Mueller | 325/42 |
| 3,524,169 | 8/1970 | McAuliffe et al. | 325/42 |

*Primary Examiner*—Albert J. Mayer
*Attorney, Agent, or Firm*—Ostrolenk, Faber, Gerb & Soffen

[57] ABSTRACT

An equalizer for a demodulated quadrature amplitude modulated signal comprises first sampling means for deriving a sole demodulated signal sample $Z(kT)$ at each of the sampling times $kT$ [$Z(t)$, a signal of complex amplitudes; $T$, the discrete code signal interval; $t = 0$, the time of occurrence of arbitrary one of maximum absolute values of the complex amplitude of the demodulated signal; $k$, integers], second sampling means for simultaneously deriving a predetermined number, $2N + 1$, of simultaneous demodulated signal samples $Z(kT - hT)$ at each of the sampling times [$h = -N, \ldots, 0, 1, \ldots, N$], variable gain means for simultaneously deriving a plurality of amplitude varied signal samples $C_h \cdot Z(kT - hT)$ from the simultaneous samples at each of the sampling times, summing means for deriving a summation of the amplitude varied signal samples at each of the sampling times, and adjusting means for adjusting the variable gains $C_h$ with reference to the sampling times, the sole demodulated signal samples, and the summations of the amplitude varied signal samples.

8 Claims, 6 Drawing Figures

SELF-ADAPTIVE EQUALIZER FOR QUADRATURE AMPLITUDE MODULATED SIGNALS

BACKGROUND OF THE INVENTION

This invention relates to an equalizer of the self-adaptive type for removing at the receiving end the intersymbol or cross-channel interference introduced into a received quadrature amplitude modulated signal by the transmission line for such a signal.

It has been known to automatically equalize a received multi-level amplitude modulated signal so as to obviate the intersymbol interference for the purpose of pertinent decoding. It has, however, been impossible to effectively equalize a received quadrature amplitude modulated signal because it has hitherto been difficult to simultaneously eliminate the interference between the in-phase and the quadrature signals. In mathematical treating, the multi-level amplitude modulated signal is represented by signals of real amplitudes $X(t)$ while the quadrature amplitude modulated signal is described by a signal of the real and the imaginary amplitudes $X(t)$ and $jY(t)$, or $Z(t)$.

In my copending Patent Application Ser. No. 261,949 filed the June 16, 1972, claiming the Convention Priority based on a Japanese Patent Application numbered 46 (42545/1972) and entitled "Equalizer of Preset Type for Quadrature Amplitude Modulated Signals," an equalizer for removing the intersymbol interference in the received quadrature amplitude modulated signal was proposed. The equalizer, however, was of the preset type. It should be pointed out in this connection that the distortion introduced into the quadrature amplitude modulated signal during the transmission thereof from the discrete code signal generator placed at the transmitting end to the demodulator installed at the receiving end is subject to change with time and that the impulse response characteristic $z(t)$ of the transmission path is consequently subject to change. Under the circumstances, the equalizer of the preset type might lose its proper performance.

SUMMARY OF THE INVENTION

It is therefore an object of the present invention to provide an equalizer of the self-adaptive type for use in removing the intersymbol interference which appears in the received quadrature amplitude modulated signal as a result of the impulse response characteristic of the transmission path between the discrete code signal generator placed in the transmitter and the demodulator installed in the receiver, even when the impulse response characteristic is subject to change during transmission and reception of the quadradure amplitude modulated signal.

It is another object of this invention to provide an equalizer of the self-adaptive type for the quadrature amplitude modulated signal, which can serve also as a decoder.

It is still another object of this invention to provide an equalizer of the type described which may be preset, if desired.

According to this invention there is provided an equalizer for equalizing a demodulated signal into an equalized signal, said demodulated signal being derived by demodulating at a receiving end a quadrature amplitude modulated signal sent from a transmitting end for a series of discrete communication code signals generated by code signal generating means placed at said transmitting end at a predetermined code signal interval $T$, said demodulated signal capable of being represented by a complex signal $Z(t)$ where $t$ represents time, each of said code signals being subjected to the impulse response characteristic of a transmission path between said code signal generating means and the demodulating means installed at said receiving end, said equalizer comprising:

first sampling means responsive to said demodulated signal for deriving a sole demodulated signal sample $Z(kT)$ at each of sampling times $kT$ where $k$ represents integers, said sampling times being determined with reference to said demodulated signal so that said demodulated signal may have maximum absolute values of amplitude substantially at said sampling times, second sampling means responsive to said demodulated signal for substantially simultaneously deriving a predetermined number of simultaneous demodulated signal samples $Z(kT - hT)$ at each of said sampling times, where $h$ represents said predetermined number of consecutive integers including zero, variable gain means for subjecting said simultaneous demodulated signal samples to said predetermined number of complex variable gains $C_h$ to substantially simultaneously derive said predetermined number of amplitude varied signal samples $C_h \cdot Z(kT - hT)$ at each of said sampling times, summing means for summing up said amplitude varied signal samples at each of said sampling times to derive a summation signal, and adjusting means for adjusting said variable gains in response to said sampling times, said sole demodulated signal samples, and said summation signals.

Figure 1:
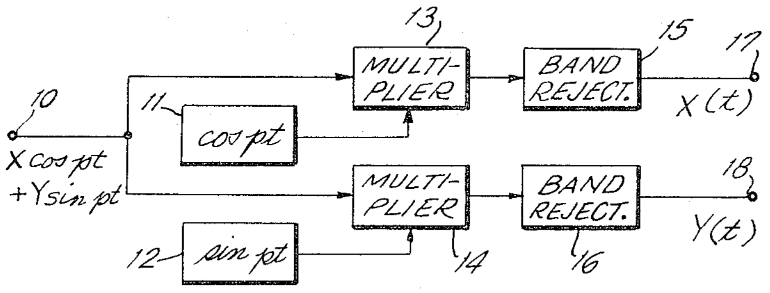
FIG. 1 is a block diagram of a demodulator used preceding an equalizer according to the instant invention.

DESCRIPTION OF THE PREFERRED EMBODIMENTS:

Referring to FIG. 1, a receiver or demodulator for an incoming quadrature amplitude modulated signal given by $$X(t) \cdot \cos pt + Y(t) \cdot \sin pt$$

comprises an input terminal 10 supplied with the incoming signal, a pair of oscillators 11 and 12 for producing oscillator output signals represented by cos $pt$ and sin $pt$, respectively, and a pair of multipliers 13 and 14 supplied with the incoming sagnal on the one hand and with the oscillator output signals, respectively, on the other hand. The demodulator further comprises a pair of band rejection filters 15 and 16 for eliminating the $2p$ angular frequency component from the respective multiplier output signals, and a first and a second output terminal 17 and 18 for the respective band rejection filter output signals. It is easily understood from the double angle formulae for sine and cosine that the signals obtained at the first and the second output terminals 17 and 18 are $X(t)$ and $Y(t)$, respectively. For convenience of the following description, the so demodulated signals $X(t)$ and $Y(t)$ will be regarded as the real and the imaginary parts of a complex demodulated signal $Z(t)$.

Figure 2:
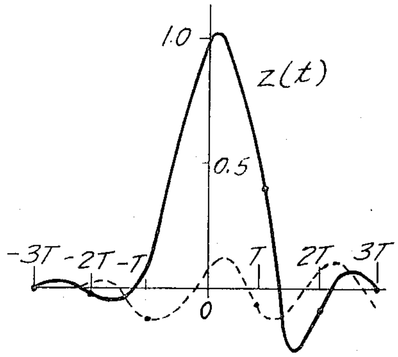
FIG. 2 shows typical wave forms of the impulse response characteristic $z(t)$ for a quadrature amplitude modulated signal.
Figure 3:
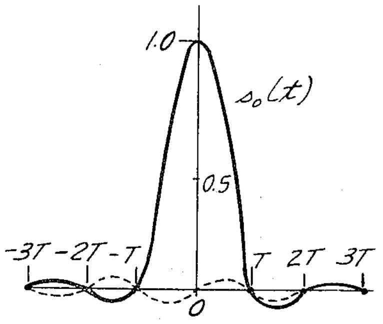
FIG. 3 shows typical wave forms of an equalized impulse response characteristic $s_0(t)$.

Referring to FIGS. 2 and 3, it is to be pointed out that the individual discrete code signals generated at the transmitting end are subjected to distortion while passing through the frequency division multiplex systems. This causes a single code signal generated at the transmitting end to spread in the demodulator output signal in such a manner that the demodulated signal for the single code signal or the unit impulse response characteristic $z(t)$ has a wave form typically illustrated in FIG. 2 with the solid line and the broken line curves for the real and the imaginary parts, respectively, where the abscissa shows the time $t$ in terms of the ordinary code signal interval T for the successive discrete communication code signals generated at the transmitting end with the origin O of the time axis put at the time at which the absolute value of the complex amplitude of the impulse response characteristic becomes the greatest and the ordinate represents the amplitude with the greatest real amplitude taken as the unit. It follows therefore that the demodulated signal $Z(t)$ for the incoming signal is given by $$Z(t) = \Sigma\ (A_k + jB_k)\cdot z(t - kT), \tag{1}$$

where the factors $A_k + jB_k$ represent complex transmission data generated at the transmitting end to become the demodulated signal at the time points $kT$ where $k$ represents integers. The fact that those relative amplitudes of the impulse response characteristic which appear at time points spaced from the time of occurrence of the greatest complex amplitude by positive and negative integral multiples of the code signal interval, such as the relative amplitudes shown in FIG. 2 at $t = \pm T$, $\pm 2T, \ldots$, are not zero but finite gives rise to the intersymbol interference to make it impossible to decode the demodulated signal into the original transmission data unless the impulse response characteristic were equalized so that the real and the imaginary parts of the resulting equalized impulse response characteristic may be characterized by a peak at $t = 0$ and zeros at $t = \pm T, \pm 2T, \ldots$ on the one hand and zeros at $t = 0, \pm T, \pm 2T, \ldots$ on the other hand, respectively, as exemplified in FIG. 3. As the case may be, the equalized signal may have a finite imaginary amplitude at $t = 0$ as will be understood with reference to the phase locking techniques for the quadrature transmission systems.

Before describing the circuitry and operation of the preferred embodimens of the present invention, the principles of this invention will be explained. In this connection, the description of the principles, the circuitry, and the operation of the previous invention described and claimed in the above referenced copending patent application shall be regarded as a part of the specification of the instant invention because the results attained by the previous invention are utilized in the present invention.

Let a quasi-equalized impulse response characteristic $s(t)$ be defined as $$s(t) = \sum_{h=-N}^{N} C_h \cdot z(t - hT), \tag{2}$$

where the factors $C_h$ represent a plurality of complex variable gains, $2N + 1$ in number. The problem here is to determine those opitimun values $C_h{\cdot}O$ of the variable gains based on the demodulated signal $Z(t)$ for which the quasi-equalized impulse response characteristic eventually becomes the closest possible approximation of the equalized impulse response characteristic $s_O(t)$ exemplified in FIG. 3. When it is desired to derive an equalized signal $s(t)$ for which the value $S(O)$ is a predetermined real number $R_O$, the optimum values are obtained as a set of solutions of simultaneous linear equations given by $$\sum_{h=-N}^{N} C_h \cdot z(kT - hT) - R_k = 0, \tag{3}$$

where $R_k = O$ for $k =$ positive and negative integers, whose absolute values may be equal to $N$ at most. When it is desired to derive an equalized signal $s(t)$ for which the value of $s(O)$ remains unchanged, the optimum values are given by solutions of a like system of simultaneous linear equations given by $$\sum_{h=-N}^{N} C_h \cdot z(kT - hT) = 0 \tag{4}$$

for $k =$ positive and negative integers, while the so-to-speak variable gain $C_O$ is an invariant which may be the unit gain.

It should be recalled here that, inasmuch as it is troublesome to directly solve Equations 3 or 4 because of the repeated calculation of determinants, the previous invention made use of the test signal representative of the unit impulse response characteristic $z(t)$ successively supplied a limited number of times and use of the successive correction method with errors for the respective linear equations or impulse response characteristic error $e(kT)$ between the substantially equalized impulse response characteristic and the amplitude modified impulse response characteristic defined by $$e(kT) = \sum_{h=-N}^{N} C_h \cdot z(kT - hT) - R_k = s(kT) - R_k \tag{5}$$

being introduced. According to an example of the simple algorithms resorted to in the previous invention for making the errors monotonously converge to zero to eventually provide the optimum values of the variable gains to be given as the solutions of Equations 3, either each of the real parts of the variable gains $C_h$ was adjusted by a positive or a negative unit amount of variation $D$ or $-D$ or the each of their imaginary parts was likewise varied by a positive or a negative imaginary unit amount of adjustment $jD$ or $-jD$. Such amounts of variation or adjustment $d_h$ were selected at each of the sampling times $kT$ in accordance with a set of rules for selection given by $$\left.\begin{aligned}
&d_h = D \text{ when } -Re[z(O)\cdot e^*(kT)] > |Im[z(O)\cdot e^*(kT)]| \\
&d_h = -D \text{ when } Re[z(O)\cdot e^*(kT)] > |Im[z(O)\cdot e^*(kT)]| \\
&d_h = jD \text{ when } Im[z(O)\cdot e^*(kT)] > |Re[z(O)\cdot e^*(kT)]| \\
&\text{and} \\
&d_h = -jD \text{ when } -Im[z(O)\cdot e^*(kT)] > |Re[z(O)\cdot e^*(kT)]|,
\end{aligned}\right\} \quad (6)$$

where $e^*(kT)$ represented the conjugate complex values of the errors $e(kT)$ and $k$ was equal to $h$. The unit amount of adjustment $D$ was much less than the predetermined real number $R_O$ divided by $|z(O)|$. Alternatively, another example of the simple algorithms for providing the optimum gains in accordance with Equations 4 was resorted to, the amounts of adjustment $d_h$ being again selected in accordance with Rules 6, except that the adjustment of the variable gains $C_h$ was withheld at a particular one of the sampling times $kT$ at that $k = O$ and that the unit amount of variation was given much less than the invariant gain $C_O$.

If it were possible also with the instant invention to determine the errors $e(kT)$ at the respective sampling times $kT$ and the greatest absolute value of the amplitude or the amplitude signal $z(O)$, the principles of the previous invention would apply. There are, however, no explicit values of $e(kT)$ and $z(O)$ in the case of this invention because no discrete test signals but the demodulated signal for those successive transmission data is available which are apparently random. It has now been discovered that the demodulated signal nevertheless implicitly includes the values corresponding to $e(kT)$ and $z(O)$ as will be discussed hereunder.

Figure 4:
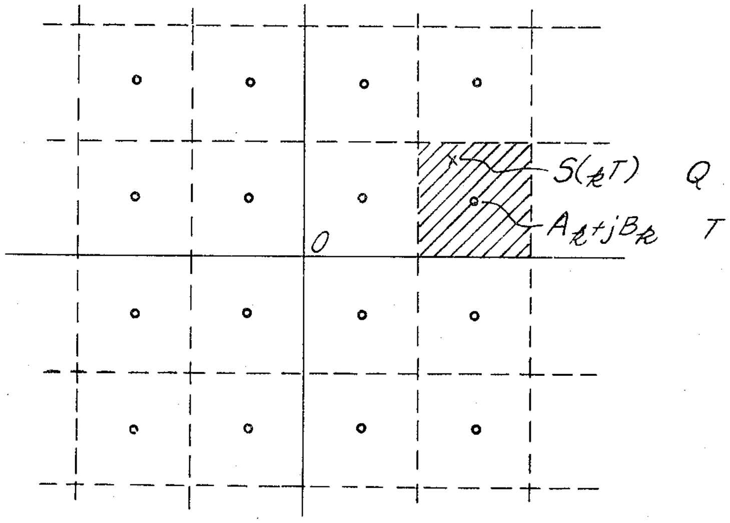
FIG. 4 illustrates a complex plane for explaining the principles of this invention.

Referring to FIG. 4 in addition to FIGS. 2 and 3, a quasiequalized code signal $S(kT)$ at each of the time points $kT$ is introduced, which is given by $$S(kT) = \sum_{i=-\infty}^{\infty} (A_i + jB_i)\cdot s(kT - iT),$$

wherein it is obvious from FIGS. 2 and 3 that the real value of the quasi-equalized impulse response characteristic $S(t)$ is approximately equal to unity for $k = i$ and equal to zero for $k$ = positive and negative integers and the imaginary value is always approximately equal to zero when $k$ = zero and positive and negative integers. It follows therefore that the quasi-equalized code signals $S(kT)$ approximates the true communication transmission data $A_k + jB_k$ as exemplified on a complex plane shown in FIG. 4 with points Q and T, respectively. The point Q gets closer to the point T as the quasi-equalized impulse response characteristic $s(t)$ gives better approximation of the ideal equalized impulse response characteristic $s_O(t)$. At any rate, it is possible with a threshold circuit to determine the area, such as that illustrated in FIG. 4 with hatches, in which the point Q falls. If the transmission data represent quantized signals, various true values of the discrete code signals distribute on the complex plane in a regular array depicted with small dots in FIG. 4. In this event, the threshold circuit would derive the true code signals $A_k + jB_k$ from the quasi-equalized code signals $S(kT)$.

In order to proceed with the discussion, let it be assumed that the predetermined real number $R_O$ in Equation 5 is equal to unity in view of FIG. 3. Furthermore, let summation error signals or errors for the quasi-equalized code signals $S(kT)$ defined by $$E(kT) = S(kT) - (A_k + jB_k)$$

be introduced. In addition, a quantity $u(k-m, k-n)$ be introduced which is given by $$u(k-m, k-n) = M_k[(A_{k-m} + jB_{k-m})\cdot(A_{k-n} - jB_{k-n})],$$

where $M_k$ is an operator for deriving the mean value of the operand for a sufficiently large number of the components $k$ of the suffixes $k-m$ and $k-n$. Incidentally, $$\begin{aligned}
Z(kT) &= \sum_{i=-\infty}^{\infty} (A_i + jB_i).z(kT - iT) \\
&= \sum_{i=-\infty}^{\infty} (A_{k-i} + jB_{k-i}).z(iT)
\end{aligned}$$

follows from Equation 1. Inasmuch as $$\begin{aligned}
S(kT) &= \sum_{i=-\infty}^{\infty} (A_{k-i} + jB_{k-i}).s(iT) \\
&= \sum_{i=-\infty}^{\infty} (A_{k-i} + jB_{k-i}).[e(iT) + R_i] \\
&= \sum_{i=-\infty}^{\infty} (A_{k-i} + jB_{k-i}).e(iT) + (A_k + jB_k),
\end{aligned}$$

it follows that $$E(kT) = \sum_{i=-\infty}^{\infty} (A_{k-i} + jB_{k-i}).e(iT),$$

while it follows that $$u(k-m, k-n) = O \quad \text{for } m = n$$

and $$u(k-m, k-n) = U \quad \text{for } m \neq n,$$

where U represents a real positive number which is independent of the suffix components $m$ and $n$ and is equal to the mean energy of the demodulated signal. Inasmuch as the operand is a product of a code signal and the conjugate value of another code signal, the latter relations are derived from the fact that the value of the code signals are irrespective of one another and distribute symmetrically with respect to the origin of the complex plane.

From the above, $$\begin{aligned}
&M_k[(A_{k-h} - jB_{k-h}).E(kT)] \\
&= M_k\left[\sum_{i=-\infty}^{\infty} (A_{k-h} - jB_{k-h}).(A_{k-i} + jB_{k-i}).e(iT)\right] \\
&= \sum_{i=-\infty}^{\infty} M_k[(A_{k-h} - jB_{k-h}).(A_{k-i} + jB_{k-i}).e(iT)],
\end{aligned}$$

from which $$m_k[(A_{k-h} - jB_{k-h})\cdot E(kT)] = U\cdot e(hT)$$

and consequently $$e(hT) = M_k[(A_{k-h} - jB_{k-h})\cdot E(kT)]/U$$

is obtained. On the other hand, $$M_k[A_k - jB_k).Z(kT)] = \sum_{i=-\infty}^{\infty} M_k[(A_k - jB_k).(A_{k-i} + jB_{k-i}).z(iT)] = U.z(O),$$

from which $$z(O) = M_k[(A_k - jB_k)\cdot Z(kT)]/U$$

is obtained.

Now that the greatest absolute value of the complex amplitude $z(O)$ of the impulse response characteristic and the errors $e(kT)$ for the respective linear equations are derived, it is possible to modify the variable gains $C_h$ by the respective amounts of adjustment $d_h$ determined in accordance with Rules 6 so as to give the solutions of Equations 3. In this connection, what is to be noted is that it is possible to repeatedly adjust the variable gains $C_h$ by using the errors $e([h - q(2N + 1)]T)$, where $q$ represents integers. As for Equations 4, the like formulae hold except that the so-to-speak variable gain $C_O$ is kept invariable here and that errors $e(q[2N + 1]T)$ are not used accordingly.

Figure 5:
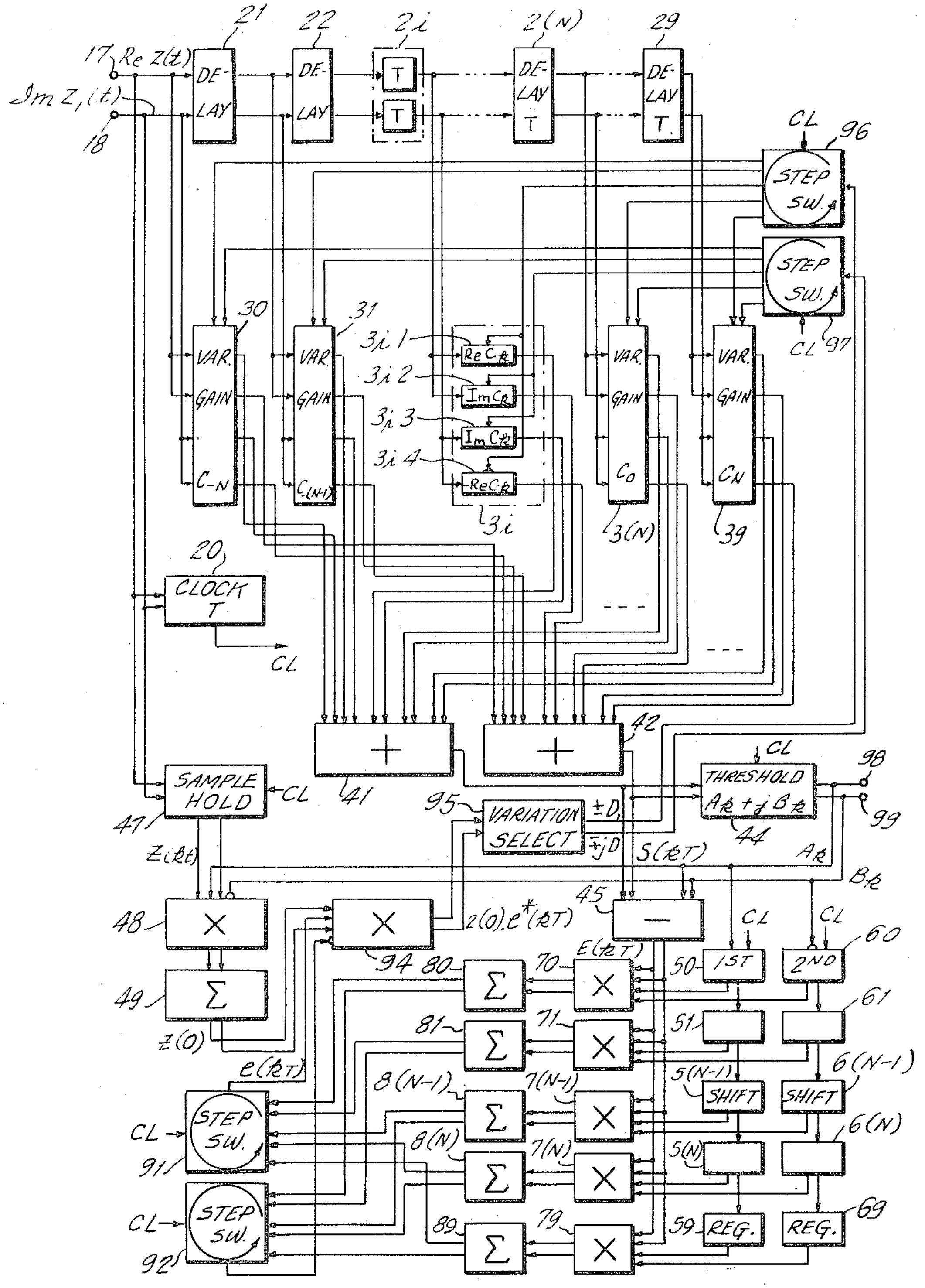
FIG. 5 is a block diagram of a first embodiment of this invention.

Referring now to FIG. 5, a first embodiment of the instant invention for self-adaptively adjusting itself to those optimum values of the variable gains $C_h$ which are determined by Equations 3 comprises a first and a second input terminal 17 and 18 which are the reproductions of the output terminals 17 and 18 shown in FIG. 1 and are supplied with the real and the imaginary parts of the demodulated signal $Z(t)$. The embodiment further comprises a clock pulse generator 20 for deriving from the demodulated signal $Z(t)$ the clock pulses CL whose phase is adjusted in the manner later described, delay units or second sampling means 21, 22, . . . , 2*i*, . . . , 2(N), . . . , and 29, $2N$ in number, successively connected with both of the input terminals 17 and 18, each including a first and a second delay circuit for giving a common delay time $T$ to the real and the imaginary part input signals, respectively, and variable gain units 30, 31, . . . , 3*i*, . . . , 3($N$), . . . , and 39, $2N + 1$ in number, connected with both of the input terminals 17 and 18 and the output terminals of the delay units 21, . . . , 2*i*, . . . , 2($N$), . . . , and 29, respectively. For convenience of description, the input terminals 17 and 18 may be regarded as the output terminals of an additional delay unit 20, not shown. The delay units 20, 21, . . . , 2*i*, . . . , 2($N$), . . . , and 29 thus produce demodulated signal samples $Z(kT - hT)$ at each of the sampling times $kT$, where $h = -N$, $-(N - 1)$, . . . , $h$, . . . , $O$, . . . , and $N$, respectively. The variable gain units 30, 31, . . . , 3*i*, . . . , 3($N$), . . ., and 39 provide variable gains $C_{-N}$, $C_{-(N-1)}$, . . . , $C_h$, . . . , $C_O$, . . . , and $C_N$ to derive amplitude varied signal samples $C_h\cdot Z(kT - hT)$, respectively. More particularly, each variable gain unit 3*i* includes a first and a second variable gain circuit 3*i*1 and 3*i*2 for giving variable gains $Re\ C_h$ and $Im\ C_h$ to the output signal derived from the corresponding one of the first delay circuits and a third and a fourth variable gain circuit 3*i*3 and 3*i*4 for subjecting the output signal of the associated second delay circuit to variable gains $Im\ C_h$ and $-Re\ C_h$. The variable gains $C_h$ are variable in the manner later described. The embodiment still further comprises a first adder 41 for summing up the amplitude varied signal samples derived from the first and the third variable gain circuits 3*i*1 and 3*i*3, a second adder 42 for summing up the amplitude varied signal samples derived from the second and the fourth variable gain circuits 3*i*2 and 3*i*4, a threshold circuit 44 controlled by the clock pulses CL and responsive to the summed up signals which are now understood to be the quasi-equalized code signals $S(kT)$ for producing the successive code signals $A_k + jB_k$, and a subtractor 45 that comprises part of the second calculating means as described hereinbelow, for subtracting the code signals from the summed up signals to derive the errors $E(kT)$.

Further referring to FIG. 5, the embodiment comprises a sample holder 47 connected with the input terminals 17 and 18 and controlled by the clock pulses CL for holding a sole demodulated signal sample $Z(kT)$ at each of the sampling times $kT$, a sole multiplier 48 supplied with the real part $A_k$ at an input terminal thereof and with the imaginary part $B_k$ at an inverted terminal thereof for multiplying the code signals $A_k - jB_k$ with the sole demodulated signal sample $Z(kT)$, and in conjunction with multiplier 48, a sole mean value calculator comprising a first calculating means 49 for summing up the sole multiplier output signal and dividing the summation by the number of the summed up signals and further by the number U calculated by averaging the energy of the demodulated signal. Inasmuch as the multiplier 48 derives the operands $$(A_k - jB_k)\cdot Z(kT),\ (A_{[k+1]} - jB_{[k+1]})\cdot Z([K + 1]T), \ldots,$$

the mean value calculator 49 provides the greatest absolute value of the amplitude or the amplitude signal $z(O)$ of the impulse response characteristic. The embodiment further includes a second calculator means that comprises a first shift register having stages 50, 51, . . . , 5($N$−1), 5($N$), . . . , and 59, $2N + 1$ in number, and shifted by the clock pulses CL for storing at each of the sampling times $kT$ the real parts $A_k$, $A_{k-1}$, . . . , $A_{k-[N-1]}$, $A_{k-N}$, . . . , and $A_{k-2N}$, respectively, a second shift register having similar stages 60, 61, . . . , 6($N$−1), 6($N$), . . . , and 69 for likewise storing the polarity reversed imaginary parts $-B_k$, $-B_{k-1}$, . . . , $-B_{k-[N-1]}$, $-B_{k-N}$, . . . , and $-B_{k-2N}$, respectively, a set of multipliers 70, 71, . . . , 7($N$−1), 7($N$), . . . , and 79 for multiplying the contents of the shift register stages 50 through 69 and the error $E(kT)$ to derive the operands $(A_{k-h} - jB_{k-h})\cdot E(kT)$, at each of the sampling times $kT$, mean value calculators 80, 81, . . . , 8($N$−1), 8($N$), . . . , and 89 for summing up the operands supplied thereto at the respective sampling times $kT$ and dividing the sums by the number of the summed up operands and further by the number $U$, and a real and an imaginary part stepping switch 91 and 92 simultaneously stepped by the clock pulses CL for deriving the output signal of that one of the mean value calculators 80 through 89 which is selected in the manner described later. Inasmuch as a particular one of the multiplier set 7*h* (not shown) produces at the sampling times $kT$, $(K + l)T$, . . . the operands $(A_{k-h} - jB_{k-h})\cdot E(kT)$, $(A_{[k+1]-h} - jB_{[k+1]-h})\cdot E[k + 1]T)$, . . . , the corresponding mean value calculator 8*h* (not shown for purposes of simplicity) produces the error signal $e(hT)$. Another particular multiplier 7($h$ − 1) produces at the sampling times $kT$, $(k + 1)T$, . . . the operands $$(A_{k-[h-1]} - jB_{k-[h-1]})\cdot E(kT),$$

$(A_{[k+1]-[h-1]} - jB_{[k+1]-[h-1]})\cdot E([k+1]T), \ldots,$ with the result that the corresponding mean value calculator 8$(h-1)$ provides the error signal $e([h-1]T)$.

Still further referring to FIG. 5, the embodiment comprises an overall multiplier 94 supplied with the greatest absolute value amplitude $z(o)$ and the real part of the successive error signals $e(hT)$ at its respective input terminals and with the imaginary part of the successive error signals $e(hT)$ at an inverted input terminal thereof for deriving the product $z(O)\cdot e^*(hT)$ used in Rules 6, an amount of variation selector 95 responsive to the overall multiplier output signal for selecting one of the amounts $D$, $-D$, $jD$, and $-jD$ in accordance with Rules 6, a third and a fourth stepping switch 96 and 97 simultaneously stepped by the clock pulses CL, and a pair of output terminals 98 and 99 for deriving the threshold circuit output signals as the decoded code signals $A_k + jB_k$. The overall multiplier 94 is a counterpart of the multiplier 63 illustrated with reference to FIG. 6 of the above cited patent application. The variation selector 95 may comprise the gate circuits 76 and 77, the comparator 80, and the polarity discriminators 81 and 82 described with reference to FIG. 6 of the reference patent application and may further comprise the switches 61 and 62, the monostable multivibrator 71, the single switch 72, and the switches 91 and 92 of the referenced embodiments for the purpose which will later be described. When the positive or the negative unit amount of adjustment $D$ or $-D$ is selected, the third stepping switch 96 supplies the amount to the pertinent one of the first variable gain circuits 3$i$1 to add the amount to the variable gain $C_h$ contained therein and to the pertinent one of the fourth variable gain circuits 3$i$4, with the polarity reversed, to algebraically add the amount to the variable gain $-Re\ C_h$ contained therein. If the positive or the negative imaginary unit amount of variation $jD$ or $-jD$ is selected, the fourth stepping switch 97 supplies the amount to the pertinent ones of the second and the third variable gain circuits 3$i$2 and 3$i$3 to add the amount to the variable gains $Im\ C_h$ contained in both of the pertinent ones. As the first and the second stepping switches 91 and 92 are stepped so as to change the signal supplied therefrom to the overall multiplier 94 from $e(hT)$ to $e([h+1]T)$, the third and the fourth stepping switches 96 and 97 are advanced so that the pertinent one thereof may supply the selected variation $d_{h+1}$ to the corresponding variable gain unit 3$(i+1)$. When the first and the second stepping switches 91 and 92 complete their respective whole revolutions so as to supply the error signal $e([h+2N+1]T)$ to the overall multiplier 94, the pertinent one of the third and the fourth stepping switches 96 and 97 adjusts afresh the $h$-th variable gain $C_h$. In this manner the variable gains are repeatedly adjusted towards the optimum values.

Yet further referring to FIG. 5 of the instant application, it will now be understood that the phase of the clock pulses should be adjusted by those maximum values of the complex amplitudes which appear in the demodulated signal $Z(t)$ and, preferably, with further reference to the significance of the decoded code signals. The output signal of the threshold circuit 44 gets closer to the true decoded code signals $A_k + jB_k$ as the variable gains $C_h$ converge into the respective optimum values. It is, however, doubtful if the threshold circuit output signal provides the code signals at the beginning of operation of the equalizer. More particularly, the maximum absolute value of the amplitudes of the demodulated signal may not occur at those time points which would give the desired sampling times $kT$. The equalizer may therefore be preset either by the demodulated signal for a limited number of substantially congruent discrete code signals generated at the transmitting end at intervals greater than $(2N+1)T$ or by the repeated use at intervals greater than $(2N+1)T$ of a demodulated signal for an isolated code signal generated at the transmitting end and stored at the receiving end in the manner taught in the above cited copending patent application. It this connection it should be appreciated that the possible change of the impulse response characteristic during transmission and reception of the quadrature amplitude modulated signal is relatively slow as compared with the speed of self-adaptivity of the equalizer. The speed may be enhanced with the use of the mean value calculators 49 and 80 through 89, each holding the mean value calculated up to a sampling time and calculating the simple arithmetic mean value of the held mean value and the output signal produced by the related one of the multipliers 48 and 70 through 79 at the next succeeding sampling time. Incidentally, the threshold circuit 44 may be the jitter reducer circuit described in "The Bell System Technical Journal," Volume XLIV, Number 9 (November 1965), pages 1813 through 1841.

Figure 6:
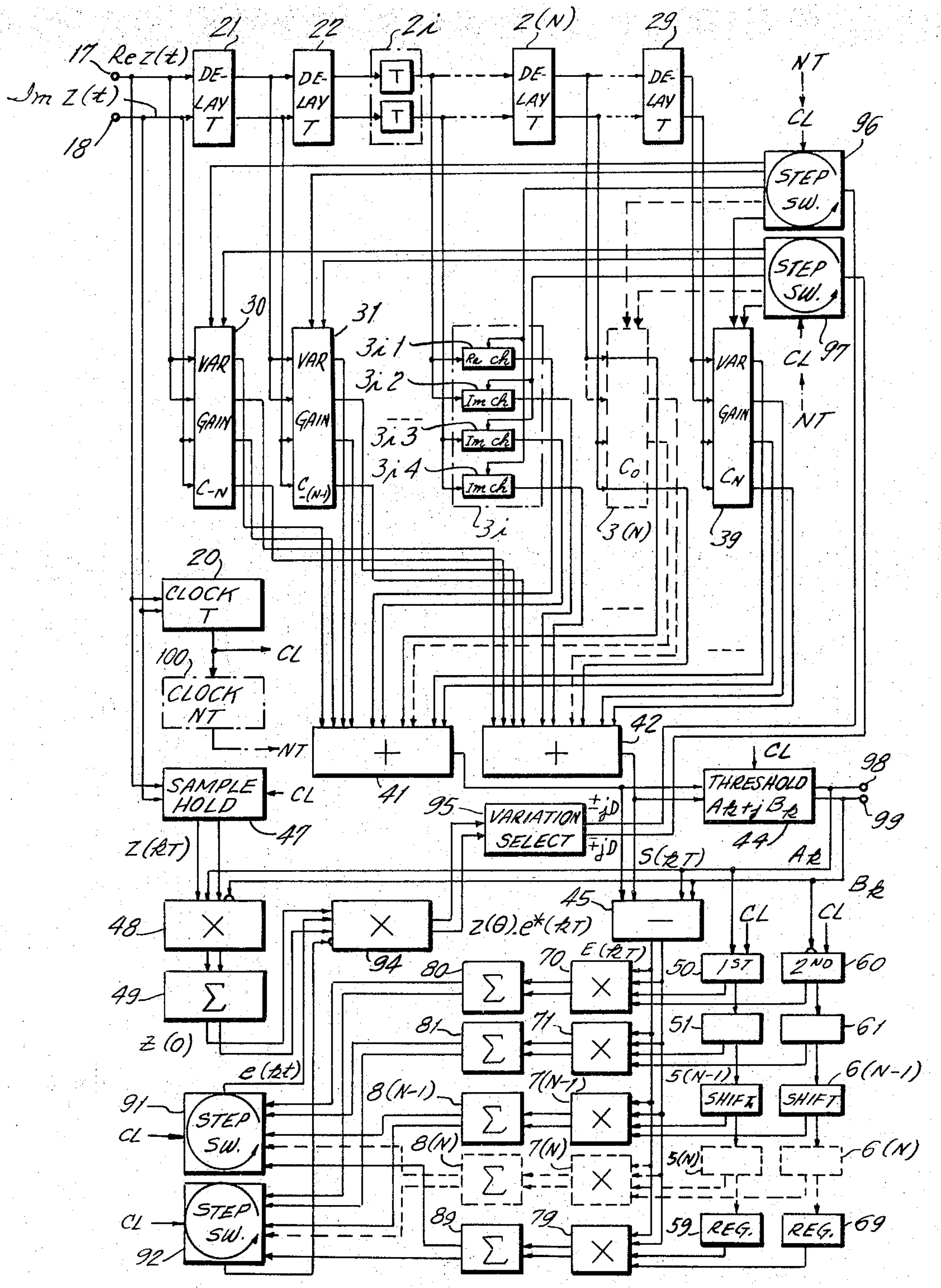
FIG. 6 is a block diagram of a second embodiment of the present invention.

Referring finally to FIG. 6, a second embodiment of the present invention for self-adaptively adjusting the variable gains $C_h$ to the optimum values determined by Equations 4 comprises a considerable number of circuit elements similar to those illustrated with reference to FIG. 5 of the instant application and designated with like reference numerals. The second embodiment, however, may not comprise the variable gain unit 3$(N)$ for the $O$-th gain $C_O$ in accordance with the fact that the $O$-th gain is an invariant here. In correspondence to the fact that it is unnecessary to adjust the $O$-th gain, the $N$-th ones of the first and the second shift register stages 50 through 69 need not have their respective output leads. Accordingly, the corresponding ones of the multiplier set 70 through 79 and the mean value calculators 80 through 89 may be dispensed with as illustrated with the dashed lines. Alternatively, the second embodiment may comprise in addition to all circuit elements of the first embodiment, a second clock pulse generator 100 depicted with imaginary lines responsive to the clock pulses CL for producing a second train of clock pulses NT which appear every time the third and the fourth stepping switches 96 and 97 are stepped by the first clock pulses to supply the amount of adjustment to the so-to-speak variable gain unit 3$(N)$ containing the invariant unit gain and which suppress such application of the amount of adjustment to the last-mentioned gain unit.

While two specific embodiments for carrying out two typical algorithms described in the referenced copending patent application have been described above, various modifications other than already mentioned are possible. For example, a shift register may be substituted for a series of cascaded delay circuits and vice versa. The clock pulse generator 20 may be a reference frequency oscillator whose output signal phase is controlled by the output signal of the sole mean value calculator 49. The variable gain units may be 15 through 21 and may not be odd but even. The mean value calculators 49 and 80 through 89 need not divide the summation by the number U. When preset, an equalizer according to the present invention can decode a demodulated signal for discrete code signals which are not quantized.

What is claimed is:

1. An equalizer for equalizing a demodulated signal into an equalized signal, said demodulated signal being derived by demodulating at a receiving end a quadrature amplitude modulated signal sent from a transmitting end for a series of discrete communication code signals generated by code signal generating means placed at said transmitting end at a predetermined code signal interval T, said demodulated signal capable of being represented by a complex signal $Z(t)$ where $t$ represents time, each of said code signals being subjected to the impulse response characteristic of a transmission path between said code signal generating means and the demodulating means installed at said receiving end, said equalizer comprising:

first sampling means responsive to said demodulated signal for deriving a sole demodulated signal sample $Z(kT)$ at each of sampling times $kT$ where $k$ represents integers, said sampling times being determined with reference to said demodulated signal so that said demodulated signal may have maximum absolute values of amplitude substantially at said sampling times, second sampling means responsive to said demodulated signal for substantially simultaneously deriving a predetermined number of simultaneous demodulated signal samples $Z(kT-hT)$ at each of said sampling times, where $h$ represents said predetermined number of consecutive integers including zero, variable gain means for subjecting said simultaneous demodulated signal samples to said predetermined number of complex variable gains $C_h$ to substantially simultaneously derive said predetermined number of amplitude varied signal samples $C_h \cdot Z(kT - hT)$ at each of said sampling times, summing means for summing up said amplitude varied signal samples at each of said sampling times to derive a summation signal, and adjusting means for adjusting said variable gains in response to said sampling times, said sole demodulated signal samples, and said summation signals wherein said equalizer is supplied with a limited number of test signals being representative of said impulse response characteristic, said test signals being used as said de-modulated signal and supplied leaving those intervals between the greatest absolute value amplitudes of said test signals that are greater than said predetermined interval multiplied by said predetermined number, said adjusting means further comprising threshold means responsive to said summation signals for producing substantially decoded communication code signals after said variable gain means is adjusted to provide substantially equalized signal samples, and wherein said communication code signals are representative of quantized data.

2. An equalizer as claimed in claim 1, wherein said adjusting means comprises:

threshold means responsive to said summation signal for deriving an approximate decoded communication code signal, first calculating means responsive to said sole demodulated signal samples and said decoded communication code signals for deriving an amplitude signal $z(O)$ representative of the substantially greatest absolute value of the complex amplitude of said impulse response characteristic $z(t)$, and second calculating means responsive to said summation signals and said decoded communication code signals for deriving at each of said sampling times an impulse response characteristic error signal $e(kT)$ representative of the difference between the substantially equalized impulse response characteristic and the amplitude modified impulse response characteristic which is said impulse response characteristic subjected to said variable gains, said adjusting means adjusting said variable gains in response to said sampling times, said amplitude signal, and said impulse response characteristic error signals.

3. An equalizer as claimed in claim 2, wherein:

said first calculating means comprises:

first multiplier means responsive to said sole demodulated signal samples $Z(kT)$ and the conjugate complex numbers $A_k - jB_k$ of said decoded communication code signals for successively deriving first products $(A_k - jB_k) \cdot Z(kT)$, each said conjugate complex number being derived by reversing the polarity of the signal representative of the imaginary part of each said decoded communication code signal, and first mean value means successively supplied with said first products for calculating the mean value of said first products to derive said amplitude signal, and said second calculating means comprises:

subtractor means responsive to said summation signals and said decoded communication code signals for successively deriving summation error signals $E(kT)$, second multiplier means responsive to said summation error signals $E(kT)$ and said conjugate complex numbers for substantially simultaneously deriving a predetermined number of second products $(A_{k-h} - jB_{k-h}) \cdot E(kT)$ at each of said sampling times, and second mean value means successively supplied with said plurality of second products produced at said sampling times for calculating the mean value of said products to derive said impulse response characteristic error signals.

4. An equalizer as claimed in claim 3, wherein said second multiplier means comprises delay means responsive to said decoded communication code signals for substantially simultaneously producing a predetermined number of simultaneous conjugate complex signals $A_{k-h} - jB_{k-h}$ representative of the conjugate complex numbers of said decoded communication code signals at each of said sampling times, said second multiplier means responsive to each of said summation error signals produced at each of said sampling times and said simultaneous conjugate complex signals produced at the last-mentioned sampling time substantially simultaneously producing said predetermined number of said second products $(A_{k-h} - jB_{k-h}) \cdot E(kT)$.

5. An equalizer as claimed in claim 2, wherein said adjusting means comprises:

overall multiplier means responsive to said amplitude signal $z(O)$ and the conjugate complex numbers $e^*(kT)$ of said impulse response characteristic error signals for successively deriving overall products $z(O)\cdot e^*(kT)$, each of the last-mentioned conjugate complex numbers being derived by reversing the polarity of the signal representative of the imaginary part of each said impulse response characteristic error signals, selecting means responsive to the real and the imaginary parts of said overall products for producing selected signals, each representative of an amount of adjustment $d_h$ given by $$d_h = D \text{ when } -Re[z(O)\cdot e^*(hT)] > |Im[z(O)\cdot e^*(hT)]|$$

$$d_h = -D \text{ when } Re[z(O)\cdot e^*(hT)] > |Im[z(O)\cdot e^*(hT)]|$$

$$d_h = jD \text{ when } Im[z(O)\cdot e^*(hT)] > |Re[z(O)\cdot e^*(hT)]|$$

and $$d_h = -jD \text{ when } -Im[z(O)\cdot e^*(hT)] > |Re[z(O)\cdot e^*(hT)]|,$$

where $D$ represents a prescribed amount of adjustment, and switching means for supplying said selected signals to said variable gain means to adjust that one of said variable gains which is determined with reference to said sampling times.

6. An equalizer as claimed in claim 5, wherein:

said selecting means produces each of said selected signals representative of the amount of adjustment $d_h$ at each of said sampling times $kT$ given by an equality $k = h - mn$, where $m$ and $n$ represent integers and said predetermined number, respectively, and said switching means supplies said selected signals to said variable gain means to adjust the $h$-th ones of said variable gains by said amounts $d_h$ at said sampling times, respectively, where $k$ and $h$ are related by said equality.

7. An equalizer as claimed in claim 5, wherein:

said selecting means produces each of said selected signals at each of particular ones of said sampling times $kT$ given by $k = h + mn$, where $m$ and $n$ represent integers and said predetermined number and $h$ is not equal to zero, and said switching means supplies said selected signals to said variable gain means to adjust the $h$-th ones of said variable gains by said amounts $d_h$ at said particular one of said sampling times, the $O$-th one $C_O$ of said variable gains being unit gain.

8. An equalizer as claimed in claim 6, further comprising means for disabling said switching means from supplying said selected signals to said variable gain means at particular ones of said sampling times $kT$, where $k = mn$, the $O$-th one $C_O$ of said variable gains being unit gain.

* * * * *